US006837214B2

(12) United States Patent
Doelker et al.

(10) Patent No.: US 6,837,214 B2
(45) Date of Patent: Jan. 4, 2005

(54) SYSTEM FOR REGULATING AN INTERNAL COMBUSTION ENGINE

(75) Inventors: Armin Doelker, Immenstaad (DE); Thomas Spaegele, Tettnang (DE); Klaus Wehler, Friedrichshafen (DE)

(73) Assignee: MTU Friedrichshafen GmbH, Friedrichshaften (DE)

( * ) Notice: Subject to any disclaimer, the term of this patent is extended or adjusted under 35 U.S.C. 154(b) by 219 days.

(21) Appl. No.: 10/169,839

(22) PCT Filed: Jan. 26, 2001

(86) PCT No.: PCT/EP01/00841

§ 371 (c)(1),
(2), (4) Date: Jul. 10, 2002

(87) PCT Pub. No.: WO01/59281

PCT Pub. Date: Aug. 16, 2001

(65) Prior Publication Data

US 2003/0000499 A1 Jan. 2, 2003

(30) Foreign Application Priority Data

Feb. 12, 2000 (DE) .......................................... 100 06 341

(51) Int. Cl.$^7$ .............................................. F02D 13/04

(52) U.S. Cl. .............. 123/329; 123/339.11; 123/406.15

(58) Field of Search ................................. 123/329, 334, 123/339.11, 339.19, 406.15, 406.17, 406.22, 406.41

(56) References Cited

U.S. PATENT DOCUMENTS

| 4,679,536 A | | 7/1987 | Morita |
| 4,944,271 A | | 7/1990 | Iwata et al. |
| 5,255,209 A | * | 10/1993 | Krebs ........................ 702/140 |
| 5,769,052 A | | 6/1998 | Oestreicher et al. |
| 5,808,189 A | * | 9/1998 | Toyoda ...................... 73/118.2 |
| 6,032,639 A | * | 3/2000 | Goto et al. ................. 123/295 |
| 6,382,191 B1 | * | 5/2002 | Curran et al. ............... 123/518 |
| 6,439,202 B1 | * | 8/2002 | Carroll et al. .............. 123/467 |
| 6,612,288 B2 | * | 9/2003 | Cullen .................... 123/406.23 |

FOREIGN PATENT DOCUMENTS

| DE | 3641854 A1 | 6/1988 |
| DE | 3912416 A1 | 10/1989 |
| DE | 4446246 C1 | 1/1996 |
| DE | 19705463 A1 | 8/1998 |
| JP | 56135750 | 10/1981 |

* cited by examiner

Primary Examiner—John T. Kwon
(74) Attorney, Agent, or Firm—Crowell & Moring LLP

(57) ABSTRACT

The invention relates to a system for regulating an internal cumbustion engine (1). Said system regulates the maximum combustion pressure by modifying the start of the injection process. The aim of the invention is to improve the operational reliability of the internal combustion engine (1). To this end, the invention provides that the maximum combustion pressure (pMAX(i)) is diagnosed by the detection of a freak value. This then determines a first or second mode and sets a diagnosis value depending on the modi. The invention also provides that the output of the injection start regulator is limited by a limiting mechanism.

50 Claims, 6 Drawing Sheets

SYSTEM FOR REGULATING AN INTERNAL COMBUSTION ENGINE

BACKGROUND AND SUMMARY OF THE INVENTION

The invention relates to a control system for an internal combustion engine, wherein the maximum combustion pressure is controlled by changing the start of injection.

DE 44 46 246 C1, originating from the applicant, discloses a control system for an internal combustion engine. In this system the maximum combustion pressure is controlled by changing the start of injection. Owing to the variable adjustability of the start of injection, the entire acceleration potential of the engine can be utilized, for example when there is a load. However, any errors, for example misfirings, are not taken into consideration in this control process.

Proceeding from the above described prior art, the object of the invention is to improve the control system with respect to operational reliability.

In the control system according to the invention, the maximum combustion pressure is diagnosed by means of outlier recognition. The outlier recognition determines a first or second mode and sets a diagnostic value as a function of the mode. To this end, the outlier recognition calculates a mean value from a first and an nth maximum combustion pressure value and determines for the values between the first and nth maximum combustion pressure their deviation from the mean value. If the deviations can be tolerated, the first mode is set. In the first mode the diagnostic value is then set to the maximum combustion pressure value. If the deviation cannot be tolerated, the second mode is set. In the second mode the diagnostic value is equivalent to the mean value.

The diagnostic value, determined previously, is sent together with a maximum combustion pressure nominal value to an injection start controller, which determines the start of injection from this system deviation. For a negative system deviation, the start of injection is delayed. The system deviation is negative, when the diagnostic value is greater than the nominal value of the maximum combustion pressure. For a positive system deviation, the injection is started earlier. The system deviation is positive, when the diagnostic value is less than the nominal value of the maximum combustion pressure, i.e. when there is still an additional pressure potential available.

The advantage of the invention lies in the fact that stochastic errors, in particular misfirings, are effectively eliminated. Thus, the quality of the control system is significantly increased. A limiting element is provided, according to the invention, as another measure to protect the control system.

One embodiment of the invention provides that an injection start precontrol value is also included in the calculation of the start of injection. This precontrol value of the start of injection is calculated by means of a group of curves. This group of curves represents a function of the engine speed and of a power-determining signal. The power-determining signal is defined, according to the invention, as the quantity of fuel injected or the travel of a control rod. A precontrol has the advantage of a short reaction time to an immediate load change.

The major distinction between the prior art control system and the invention lies in the fact that the feedback control occurs at every engine operating point and not just when there is a load.

The control system, described in the invention, can be installed in internal combustion engines by common rail construction method, PLD construction method (pump-line-nozzle) or a conventional construction method.

BRIEF DESCRIPTION OF THE DRAWINGS

The figures show a preferred embodiment.

DETAILED DESCRIPTION OF THE DRAWINGS

Figure 1:
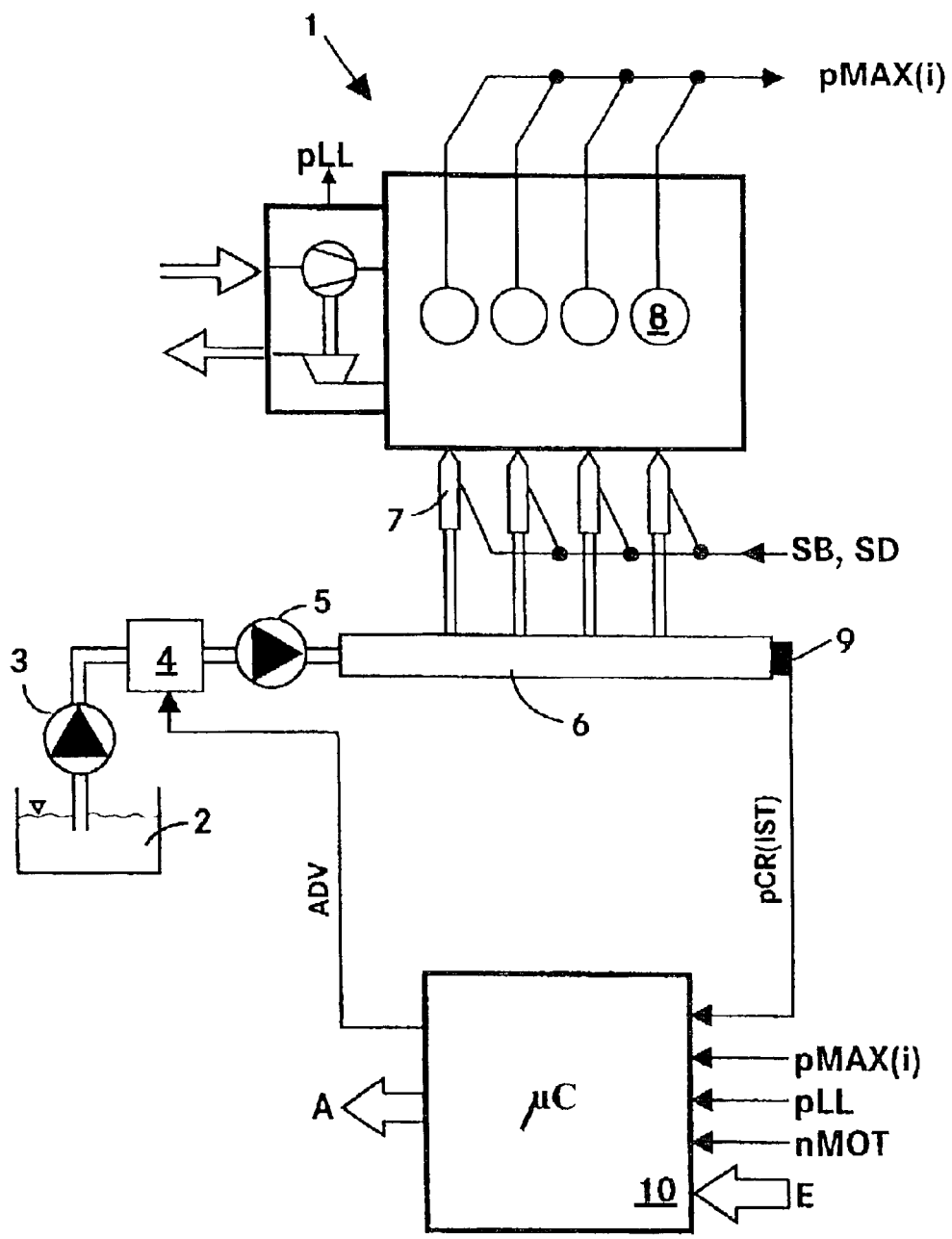
FIG. 1 is a system diagram.

FIG. 1 is a block diagram of an internal combustion engine with an accumulator fuel injection system (common rail). It shows an internal combustion engine 1 with a turbo charger and a charge air cooler, an electronic engine control unit 10, a first pump 3, a second pump 5, a high pressure accumulator (rail) 6, injectors 7, attached thereto, and a throttle valve 4. The first pump 3 conveys the fuel from a fuel tank 2 via the throttle valve 4 to the second pump 5. It in turn conveys the fuel under high pressure into the high pressure accumulator 6. The pressure level of the high pressure accumulator 6 is measured by a rail pressure sensor 9. Lines with adjoining injectors 7 for each cylinder of the internal combustion engine 1 branch off from the high pressure accumulator 6.

The electronic engine control unit 10 controls and regulates the state of the internal combustion engine 1. It has the usual components of a microcomputer system, for example a microprocessor, input/output components, buffer and memory components (EEPROM, RAM). In the memory components the operating data, relevant for operating the internal combustion engine 1, are applied in groups of curves/characteristic lines. The input variables of the electronic engine control unit 10 that are shown as an example in FIG. 1 are: maximum combustion pressure pMAX(i), which is measured by means of a pressure sensor 8, pressure pCR(ACTUAL) of the high pressure accumulator 6, pressure level of the turbo charger pLL, and speed nMOT of the internal combustion engine 1. Other input variables relevant for operating the internal combustion engine 1 are depicted with the reference character E. The actuating signals for the injectors 7, corresponding to the start of injection SB and the duration of injection SD, and the actuating signal ADV for the throttle valve 4 are depicted as the output variables A of the electronic engine control unit 10. The feed to the second pump 5 is set by way of the throttle valve 4.

Figure 2:
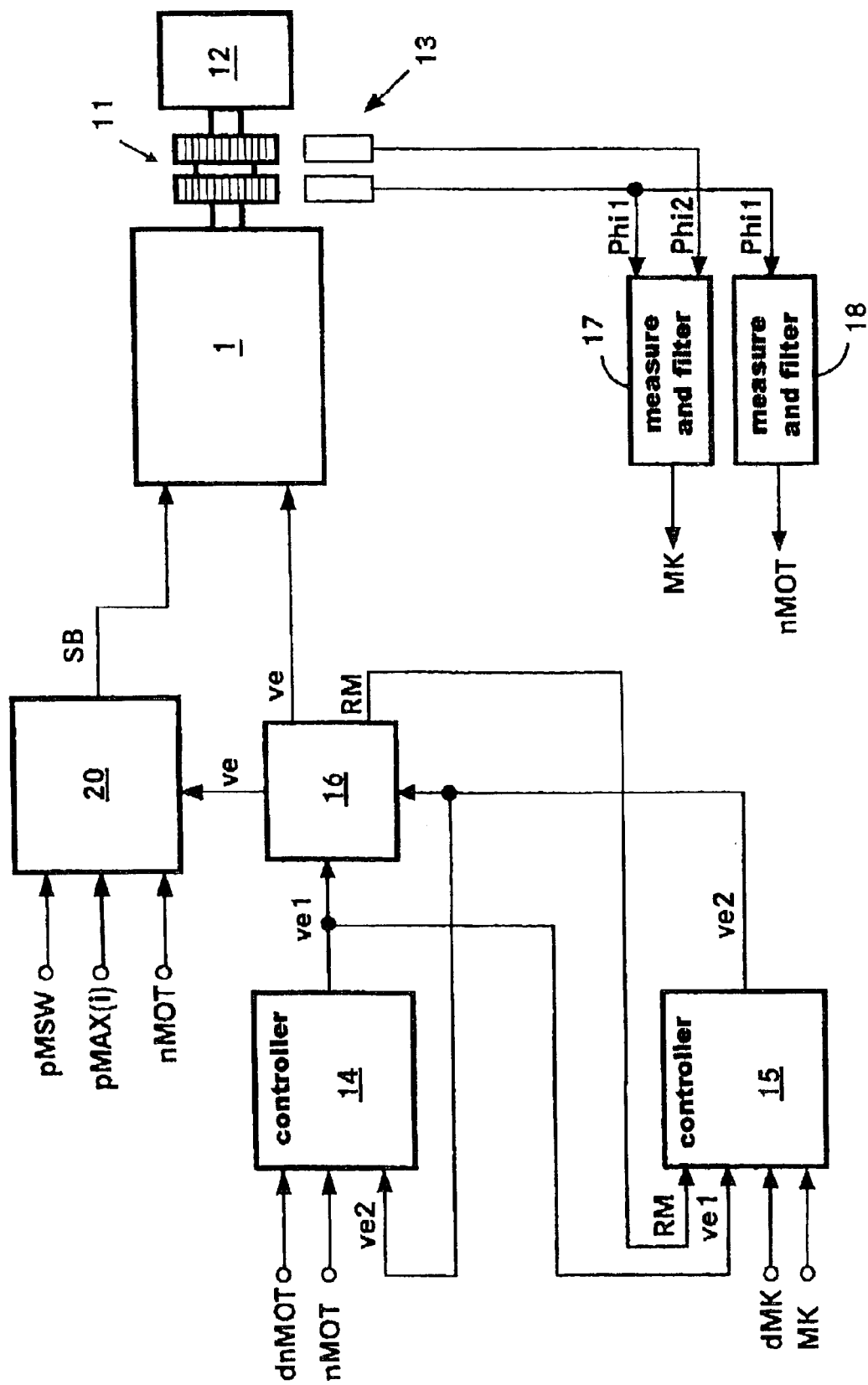
FIG. 2 is a block diagram.

FIG. 2 is a block diagram of the control system of the internal combustion engine 1 with a coupled control circuit configuration. Depicted are: a speed controller 14, an engine torque controller 15, selection means 16, an injection start controller 20 and the internal combustion engine 1 with the injection system. The internal combustion engine 1 drives via a clutch 11 an engine load 12, for example a water jet drive. The tooth angles Phi1 and Phi2 of the clutch 11 are detected by speed sensors 13. The engine speed nMOT is calculated from the tooth angle Phi1 via the function block measure/filter 18. Via the function block measure/filter 17 the engine torque MK at the output end of the internal combustion engine 1 is determined from the two tooth angles Phi1 and Phi2. As an alternative to the measured engine torque MK it can also be calculated by means of a mathematical model. For example, the mathematical model can include a thermodynamic mapping of the internal combustion engine.

The input variables of the speed controller 14 are: the engine speed nMOT, a speed differential dnMOT and a signal ve2. The speed differential, characterizing the desired power, is calculated from the engine speed nMOT and a nominal value. The signal ve2 corresponds to the output signal of the engine torque controller 15. The output variable of the speed controller 14 is a signal ve1. It is sent to the selection means 16 and the engine torque controller 15. The input variables of the engine torque controller 15 are: the engine torque MK, a torque differential dMK, the signal ve1 and a controller mode RM. The torque differential dMK is calculated from the engine torque MK and a maximum allowable engine torque. The output signal of the engine torque controller 15 is the signal ve2. It is sent to the selection means 16 and the speed controller 14.

By way of the selection means 16 it is determined which of the two controllers 14 or 15 is dominant. To this end, the selection means 16 has a minimum value choice. The signal ve1 is set via the minimum value choice as the power determining signal ve, when the signal ve1 is smaller than or equal to the signal ve2. In this case the controller mode RM is set to a first value. It is equivalent to operating the internal combustion engine in the speed mode. The signal ve2 is set as the power determining signal ve, when it is less than the signal ve1. In this case the controller mode RM is set to a second value. It corresponds to operating the internal combustion engine in the torque limiting mode. The output signals of the selection means 16 are the power-determining signal ve and the controller mode RM. The power-determining signal ve is sent to the injection unit of the internal combustion engine 1 and the injection start controller 20. The power-determining signal ve is defined, according to the invention, as the quantity of fuel injected or the travel of a control rod.

The input variables of the injection start controller 20 are: the engine speed nMOT, the maximum combustion pressure pMAX(i), the nominal value of the maximum combustion pressure pMSW and the power-determining signal ve, provided by the selection means 16. The output variable of the injection start controller 20 is the start of injection SB, which is sent to the internal combustion engine 1.

Figure 3:
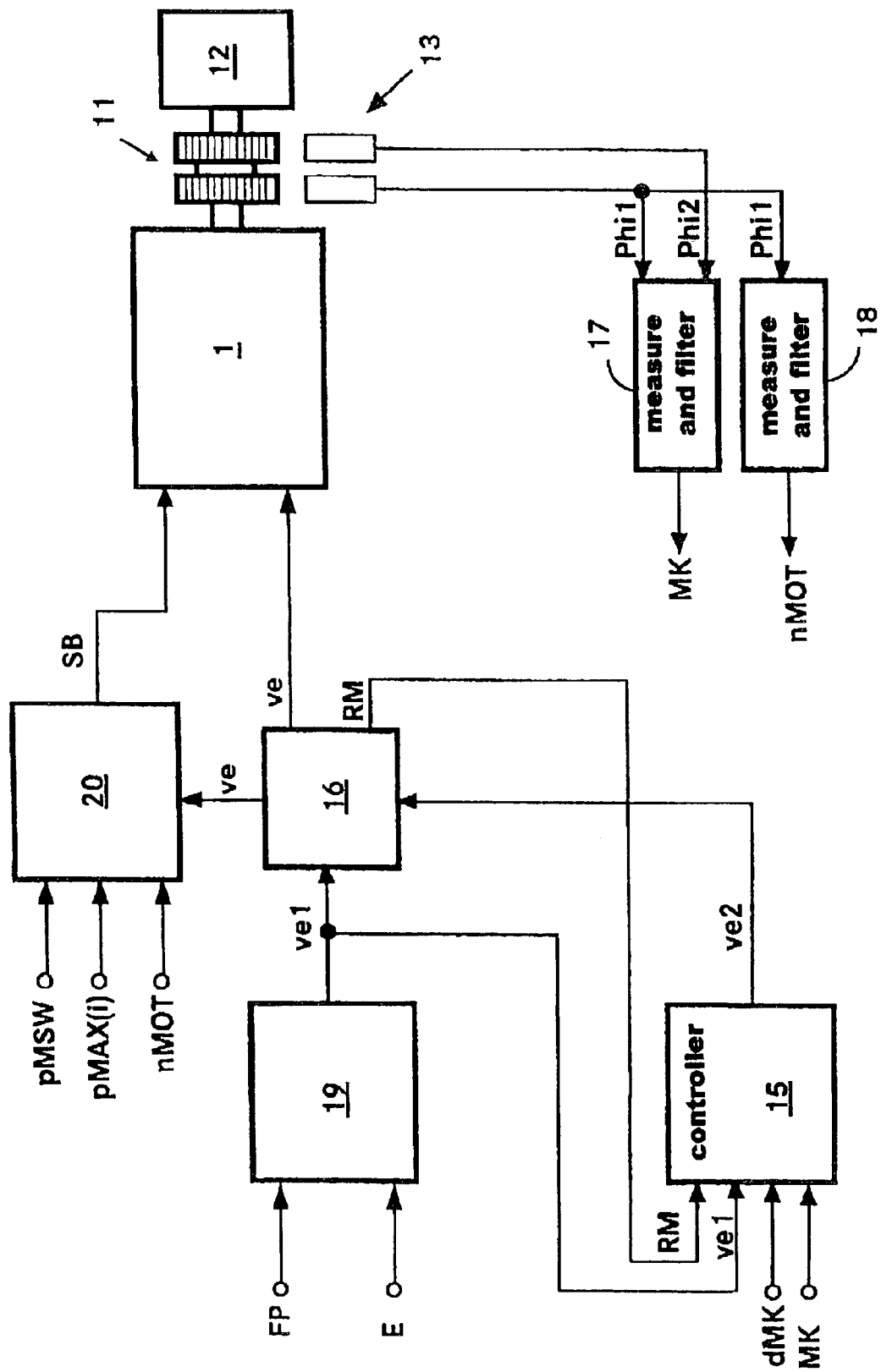
FIG. 3 is a block diagram.

FIG. 3 shows an alternative configuration of the block diagram of FIG. 2. In contrast to FIG. 2, the signal ve1 in this block diagram is calculated via a function block 19 as a function of the desired power, which is accelerator pedal FP in the illustrated embodiment. The function block 19 includes the conversion of the accelerator pedal position into the signal ve1. To this end, the corresponding characteristic lines, including a limit, are provided. The input variables that are necessary for the conversion are depicted with the reference character E, for example the engine speed nMOT, charge air pressure pLL, etc.

Another difference is that in the block diagram according to FIG. 3, the signal ve2 is sent exclusively to the selection means 16. In contrast to FIG. 2, there is no comparison between the nominal and the actual engine speed, since the desired power is predetermined by means of the acceleration pedal. The rest of the configuration corresponds to that of FIG. 2, so that what was stated there is applicable.

Figure 4:
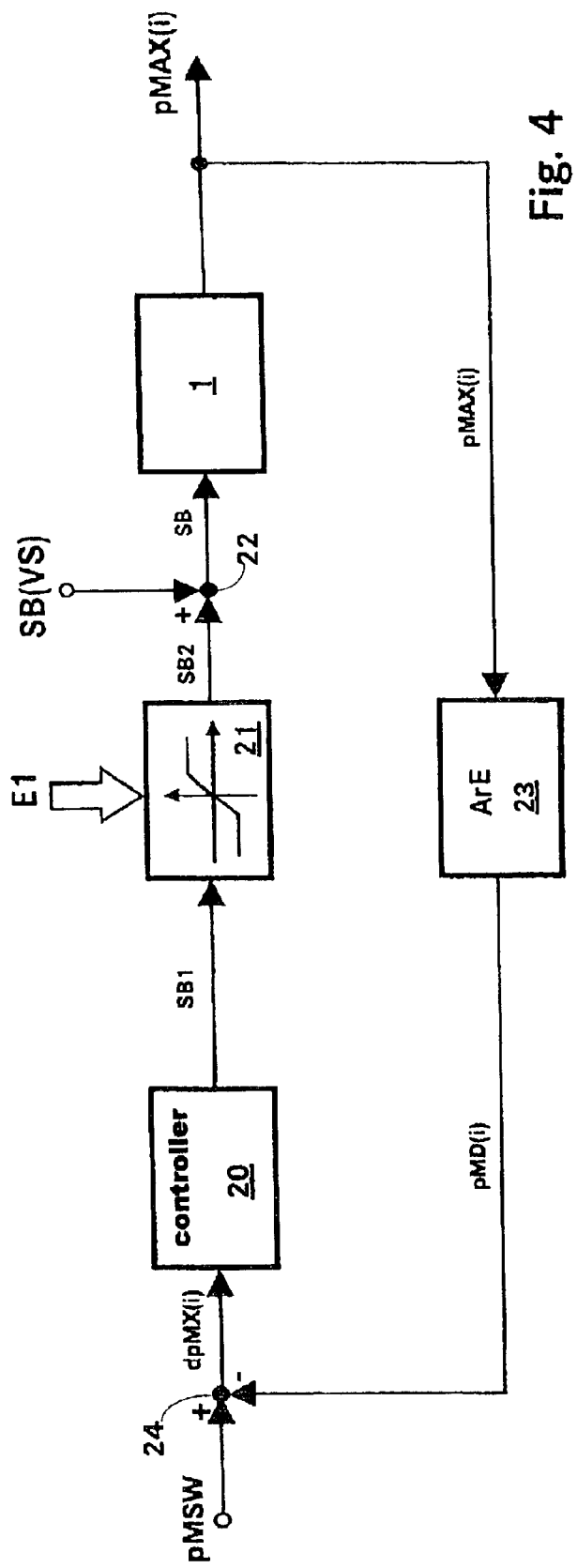
FIG. 4 depicts a control circuit configuration.

FIG. 4 depicts the control circuit for the start of injection. It includes: the injection start controller 20, a limiting element 21, the internal combustion engine 1, corresponding to the controlled system, and the outlier recognition (ArE) 23. The input variables of the control circuit are the nominal value of the maximum combustion pressure pMSW, an input variable E1 and an injection start precontrol value SB(VS). The output variable of the control system is the maximum combustion pressure pMAX(i). It is measured by means of the pressure sensors 8, as depicted in FIG. 1. The maximum combustion pressure pMAX(i) is the input variable for the outlier recognition 23. It diagnoses the maximum combustion pressure. Thus, a first or second mode is determined as a function of the diagnosed values. The outlier recognition 23 sets a diagnostic value pMD(i) as a function of the modes. In the first mode the diagnostic value pMD(i) corresponds to the maximum combustion pressure pMAX(i). In the second mode the diagnostic value pMD(i) is equivalent to a calculated mean value.

Additional explanations are based on an example, wherein three maximum combustion pressure values are measured chronologically in succession. At time t(1) a mean value is calculated from the first and third maximum combustion pressure value. Then, the mean value is subtracted from the second measurement value. This deviation is considered to be a measure for how plausible this second measurement value is. If this deviation is less than a limiting value, for example −5 bar, then the diagnostic value pMD(i) is set to the mean value, calculated previously. Thereafter the process is repeated at time t(i+1).

Figure 6:
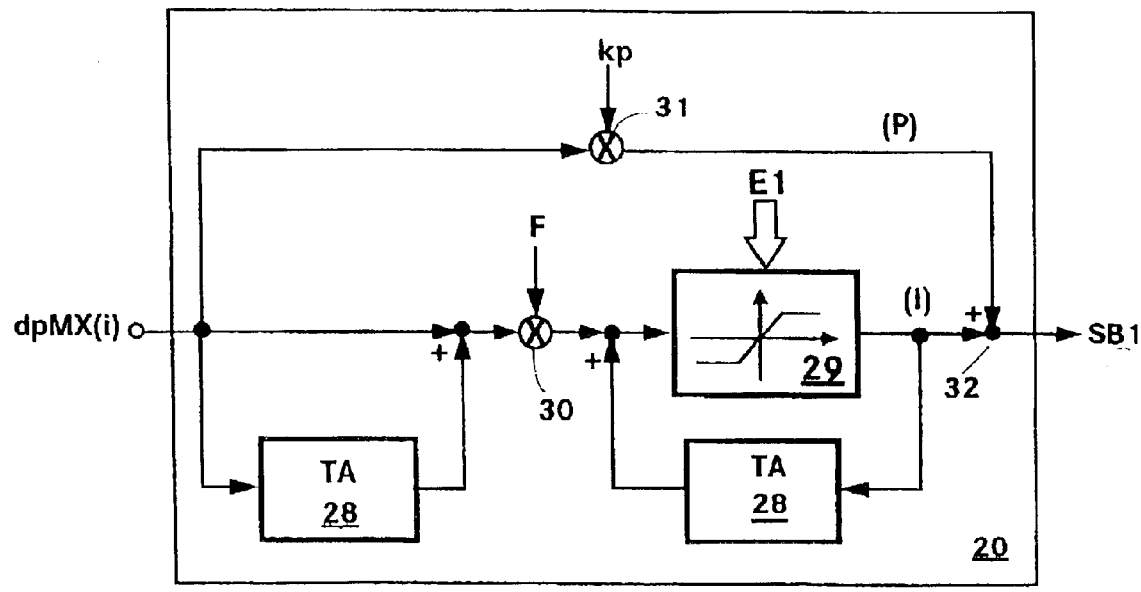
FIG. 6 depicts an injection start controller.

The system deviation dpMX(i) is determined via summation 24 from the diagnostic value pMD(i) and the nominal value of the maximum combustion pressure pMSW. The nominal value is calculated by means of a group of curves resulting from the engine speed nMOT and the power-determining signal ve. The system deviation dpMX(i) is the input variable of the injection start controller 20. The output variable of the injection start controller 20 is the start of injection, marked SB1 in FIG. 1. In the case of a negative system deviation, the start of injection is delayed. The system deviation is negative when the diagnostic value pMD(i) is greater than the nominal value of the maximum combustion pressure pMSW. In the case of a positive system deviation, the injection is started earlier. The system deviation is positive, when the diagnostic value pMD(i) is less than the nominal value of the maximum combustion pressure pMSW, that is, when an additional pressure potential is still available. The internal structure of the injection start controller 20 is shown in FIG. 6 and is explained in conjunction with FIG. 6.

Figure 5:
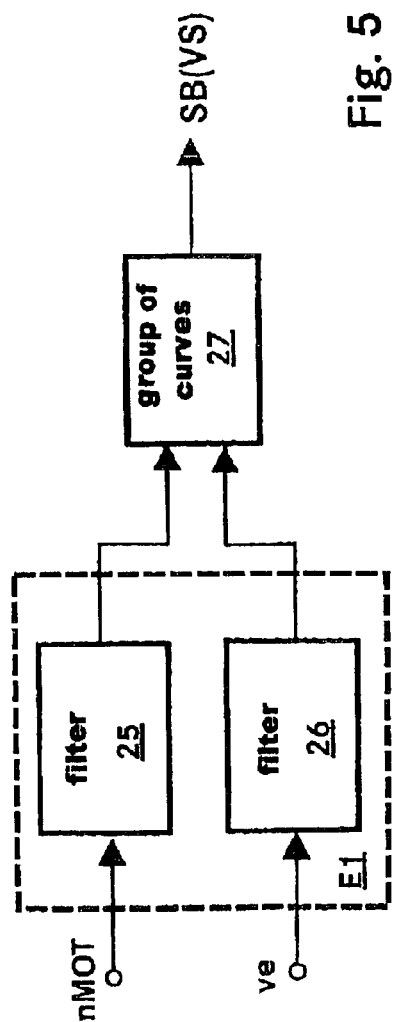
FIG. 5 is a block diagram of the injection start precontrol.

The start of injection SB1 is sent to a limiting element 21. The changes in the start of injection are limited by way of the limiting element 21. In practice a value of +/−5 degrees crankshaft angle has proved useful. The limiting can be done by means of a minimum and maximum value or a characteristic line or a group of curves. For the minimum and maximum value, the changes in the start of injection are limited to a minimum MIN and maximum MAX allowable value. If the limiting is done via a characteristic line, then it denotes a function of the engine speed nMOT or the filtered engine speed. As an alternative the characteristic line can also denote a function of the power-determining signal ve or the filtered power-determining signal. If a group of curves is used, another input variable E1 is sent to the limiting element 21. The input variable E1 corresponds, as shown in FIG. 5, to the engine speed nMOT, filtered by means of a filter 25, and the power-determining signal ve, filtered by means of a filter 26. The output variable of the limiting element 21 is a start of injection SB2. It is linked additively to the injection start precontrol value SB(VS) at the summation point 22. The injection start precontrol value SB(VS) is fixed by means of a group of curves 27 resulting from the engine speed nMOT and the power-determining signal ve, or its filtered values. The determination of the precontrol value SB(VS) is depicted in FIG. 5. The precontrol operation has the advantage that the start of injection SB reaches faster the new stationary value when changing the operating point. In a simpler implementation of the invention the control system can also be designed without precontrol.

Then the start of injection SB, resulting from the two variables SB2 and SB(VS), is sent to the internal combustion engine 1. Thus, the control circuit is closed.

To obtain higher stationary accuracy of the maximum combustion pressure control, it can be provided that a filter follows the outlier recognition 23. This feature is not depicted in FIG. 4. This filter prevents the sudden changes in the nominal value of the maximum combustion pressure pMSW from inducing a sudden response of the maximum combustion pressure pMAX(i).

In FIG. 6 the internal structure of the injection start controller 20 is simplified. It includes essentially a limiting element 29 and two function blocks 28, which are examples of the scanning time TA. The input variable of the injection start controller is the system deviation dpMX(i). The output variable is the start of injection, here SB1. FIG. 6 depicts a PI controller. The system deviation dpMX(i) is added to a system differential, which is delayed by a scanning time (TA 28), at a summation point and linked to a factor F at a multiplication point 30. In this respect the factor F denotes a function of a proportional coefficient kp, the scanning time TA and a time constant Tn. The time constant Tn can be either constant or calculated as a function of the engine speed nMOT. The calculated product is linked at a summation point to an output variable (I) of the limiting element 29. Said output variable is delayed by a scanning time (TA 28). The limiting element 29 limits the integrating portion (I portion). The limiting element 29 can be designed like the limiting element 21 of FIG. 4. The I portion is linked to a proportional portion (P portion) at the summation point 32. The result is the start of injection, here SB1. The P portion is calculated from the system deviation pdMX(i) and a proportional coefficient kp. They are linked together multiplicatively by multiplication 31. The proportional coefficient kp can be either constant or calculated as a function of the input variable E1. As depicted in FIG. 5, the input variable E1 corresponds to the filtered engine speed nMOT and the filtered power-determining signal ve.

Figure 7:
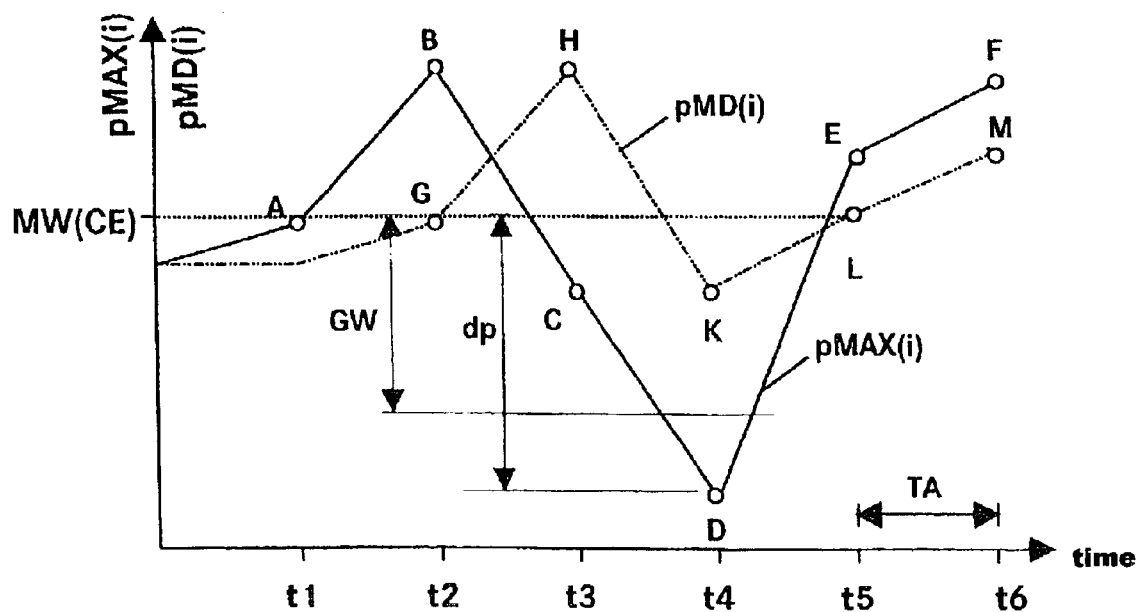
FIG. 7 is a timing diagram.

FIG. 7 shows a timing diagram for the operating mode of the outlier recognition 23. The curve with the solid line, corresponding to points A to F, corresponds to an assumed course of the maximum combustion pressure pMAX(i). The curve with the dashed, two-dotted line, corresponding to points G to M, corresponds to the diagnostic value pMD(i), thus the output variable of the outlier recognition 23. The period of time between two points in time, plotted on the abscissa, is equivalent to the scanning time TA. The curve of the diagnostic value pMD(i) is offset in time by one scanning period with respect to the curve of the maximum combustion pressure pMAX(i).

Additional explanations assume that the outliers are recognized by means of three values of the maximum combustion pressure pMAX(i): pMAX(1) to pMAX(3). Of course, it is also possible to use more values without altering the essence of the invention. These three measurement values pMAX(1) to pMAX(3) correspond, for example, to the points C, D and E. At time t5 the mean value is determined from the first value and the third value. In FIG. 7 this mean value is depicted as a dashed line with the ordinate value MW(CE). Thereupon the mean value MW(CE) is subtracted from the maximum combustion pressure value of point D, thus the second measurement value pMAX(2). This difference is negative. In FIG. 7 the amount is shown as dp. In the present example it was assumed that this difference dp is less than a limiting value GW, for example −5 bar. In this case the maximum combustion pressure value of the point D is recognized as implausible; and the outlier recognition 23 sets the second mode. In the second mode the diagnostic value pMD(i) is set to the mean value MW. In FIG. 7 this set diagnostic value pMD(i) is equivalent to the value of point L.

In the next scanning step, thus at time t6, the corresponding mean value is determined from the values of points D and F. Then the second value, here the maximum combustion pressure value of point E, is brought into relation to this mean value.

Figure 8:
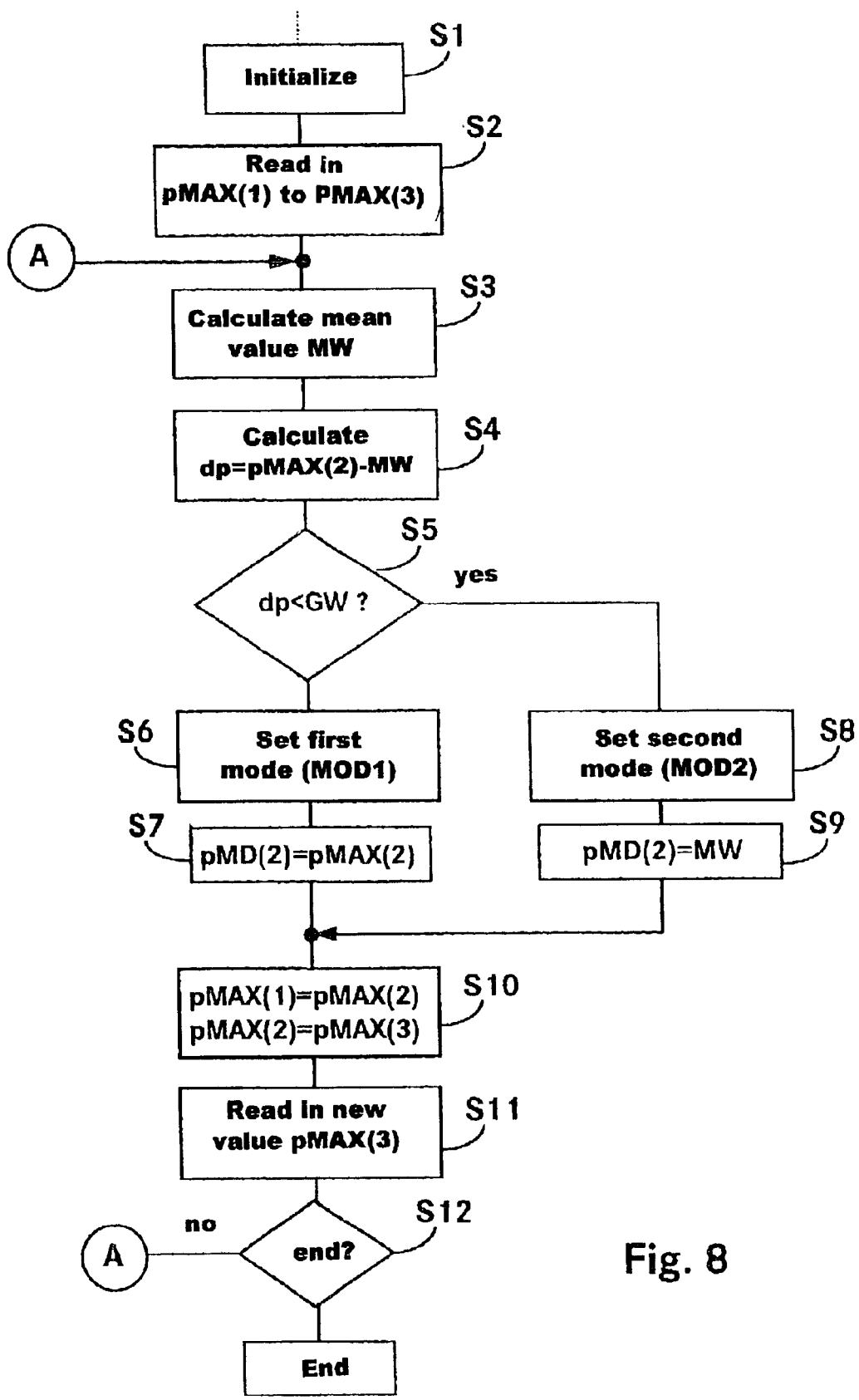
FIG. 8 is a program flowchart.

FIG. 8 shows a program flowchart for diagnosing the maximum combustion pressure value pMAX(i) in a simplified form. In this program flowchart the example is based on FIG. 7. In step S1 the starting values are set. Thereupon in step S2 three current values of the maximum combustion pressure pMAX(1) to pMAX(3) are read in. Then in step S3 the mean value MW is calculated from the first and third value of the maximum combustion pressure. In step S4 a difference dp between the second value of the maximum combustion pressure pMAX(2) and the mean value MW is calculated. After that in step S5 it is checked whether this difference is less than a limiting value GW. If the polling is positive, then in step S8 the second mode MOD2 is set, and in step S9 the diagnostic value pMD(2) is set to the mean value MW. If the polling in step S5 is negative, that is the second value pMAX(2) of the maximum combustion pressure is plausible, then in step S6 the outlier recognition 23 sets the first mode MOD1. Thereafter in step S7 the diagnostic value pMD(2) is set to the second value pMAX(2). In step S10 the first value pMAx(1) is overwritten with the second value pMAX(2) of the maximum combustion pressure; or the second value pMAX(2) is overwritten with the third value pMAX(3). Thereafter in step S11 a new maximum combustion pressure pMLAX(3) is read in. In S12 it is checked whether an end condition is recognized. If this is not the case, the program flowchart branches off to point A with a renewed calculation of the mean value MW. If an end condition is recognized in step S12, then the program run is terminated.

The control system of the invention can be used in an internal combustion engine, wherein each cylinder is measured. The maximum combustion pressure is controlled by way of the start of injection, thus by individual cylinder. As an alternative the control system can also be used in an internal combustion engine, wherein only a specified number of cylinders has a corresponding pressure sensor. In this case the invention provides that a representative maximum combustion pressure is calculated from the measured maximum combustion pressure values of the specified cylinders; and from that a representative start of injection is calculated. Then the representative start of injection is used to control all cylinders.

What is claimed is:

1. A control system for an internal combustion engine, wherein a maximum combustion pressure is controlled by changing the start of injection, the control system comprising:

an outlier recognition, wherein the outlier recognition identifies the maximum combustion pressure and determines a first or second mode and a diagnostic value as a function of the first or second mode, wherein the outlier recognition determines the first or second mode by calculating a mean value from a first and an nth maximum combustion pressure value, by calculating for each additional maximum combustion pressure value, between the first and nth maximum combustion pressure values, a difference with respect to the mean value and by setting the first mode, when the difference is greater than or equal to a limiting value, or by setting the second mode, when the difference is less than the limiting value.

2. The control system of claim 1, wherein in the first mode the diagnostic value is set to the current maximum combustion pressure value.

3. The control system of claim 2, wherein in the second mode the diagnostic value is set to the mean value.

4. The control system of claim 3, wherein the diagnostic value is filtered.

5. The control system of claim 3, wherein a system deviation is determined from the diagnostic value and a nominal value of the maximum combustion pressure, and the start of injection is determined from the system deviation by an injection start controller.

6. The control system of claim 5, wherein the nominal value of the maximum combustion pressure is determined via a group of curves, whereby the group of curves denotes a function of an engine speed and a power-determining signal.

7. The control system of claim 5, wherein the start of injection is delayed when the system deviation is negative.

8. The control system of claim 5, wherein the injection started earlier when the system deviation is positive.

9. The control system of claim 5, wherein the start of injection, calculated by the injection start controller, is limited by a limiting element.

10. The control system of claim 9, wherein the limiting element includes a minimum and maximum value so that the start of injection is limited to a minimum and a maximum allowable value.

11. The control system of claim 9, wherein the limiting element includes a characteristic line, whereby the characteristic line denotes a function of the engine speed or the power-determining signal.

12. The control system of claim 9, wherein the limiting element includes a group of curves, whereby the group of curves denotes a function of the engine speed and the power-determining signal.

13. The control system of claim 5, wherein an injection start precontrol value is also included in the calculation of the injection start.

14. The control system of claim 13, wherein the injection start precontrol value is determined by a group of curves, whereby the group of curves denotes a function of the engine speed and the power-determining signal.

15. The control system of claim 5, wherein the injection start controller has an integrating portion, whose time constant is either constant or is calculated as a function of the engine speed.

16. The control system of claim 15, wherein the injection start controller also has a limiting element for limiting the I portion.

17. The control system of claim 11, wherein the engine speed and the power-determining signal are also filtered.

18. The control system of claim 15, wherein the injection start controller also has a proportional portion.

19. The control system of claim 18, wherein a proportional coefficient of the P portion is constant.

20. The control system of claim 19, wherein the proportional coefficient of the P portion is calculated as a function of the power-determining signal.

21. The control system of claim 20, wherein the proportional coefficient of the P portion is also calculated as a function of the engine speed.

22. The control system of claim 21, wherein the engine speed and the power-determining signal for calculating the P portion are also filtered.

23. A control system for an internal combustion engine, wherein a maximum combustion pressure is controlled by changing the start of injection, the control system comprising:
an outlier recognition, wherein the outlier recognition identifies the maximum combustion pressure and determines a first or second mode and a diagnostic value as a measured for fewer than all cylinders of the internal combustion engine.

24. The control system of claim 23, wherein a representative maximum combustion pressure and a representative injection start are determined from the maximum combustion pressure values of the specified cylinders.

25. The control system of claim 24, wherein the representative injection start is used for controlling all cylinders.

26. A method for controlling a maximum combustion pressure of an internal combustion engine by changing the start of injection, the method comprising:
identifying the maximum combustion pressure; and
determining a first or second mode and a diagnostic value as a function of the first or second mode, wherein the step of determining the first or second mode includes determining the first or second mode by calculating a mean value from a first and an nth maximum combustion pressure value, by calculating for each additional maximum combustion pressure value, between the first and nth maximum combustion pressure values, a difference with respect to the mean value, and by setting the first mode, when the difference is greater than or equal to a limiting value, or by setting the second mode, when the difference is less than the limiting value.

27. The method of claim 26, further comprising, in the first mode, setting the diagnostic value to the current maximum combustion pressure value.

28. The method of claim 27, further comprising, in the second mode, setting the diagnostic value to the mean value.

29. The method of claim 28, further comprising filtering the diagnostic value.

30. The method of claim 28, further comprising:
determining a system deviation from the diagnostic value and a nominal value of the maximum combustion pressure; and
determining the start of injection from the system deviation by an injection start controller.

31. The method of claim 30, further comprising determining the nominal value of the maximum combustion pressure via a group of curves, whereby the group of curves denotes a function of an engine speed and a power-determining signal.

32. The method of claim 30, further comprising delaying the start of injection when the system deviation is negative.

33. The method of claim 30, further comprising advancing the start of injection when the system deviation is positive.

34. The method of claim 30, further comprising limiting the start of injection, calculated by the injection start controller, by a limiting element.

35. The method of claim 34, wherein the limiting element includes a minimum and maximum value so that the start of injection is limited to a minimum and a maximum allowable value.

36. The method of claim 34, wherein the limiting element includes a characteristic line, whereby the characteristic line denotes a function of the engine speed or the power-determining signal.

37. The method of claim 34, wherein the limiting element includes a group of curves, whereby the group of curves denotes a function of the engine speed and the power-determining signal.

38. The method of claim 30, wherein an injection start precontrol value is also included in the calculation of the injection start.

39. The method of claim 38, further comprising determining the injection start precontrol value by a group of curves, whereby the group of curves denotes a function of the engine speed and the power-determining signal.

40. The method of claim 30, wherein the injection start controller has an integrating portion, whose time constant is either constant or is calculated as a function of the engine speed.

41. The method of claim 40, wherein the injection start controller also has a limiting element for limiting the I portion.

42. The method of claim 36, further comprising filtering the engine speed and the power-determining signal.

43. The method of claim 40, wherein the injection start controller also has a proportional portion.

44. The method of claim 43, wherein a proportional coefficient of the P portion is constant.

45. The method of claim 44, further comprising calculating the proportional coefficient of the P portion as a function of the power-determining signal.

46. The method of claim 45, further comprising calculating the proportional coefficient of the P portion as a function of the engine speed.

47. The method of claim 46, further comprising filtering the engine speed and the power-determining signal for calculating the P portion.

48. A method for controlling a maximum combustion pressure of an internal combustion engine by changing the start of injection, the method comprising:

identifying the maximum combustion pressure;

determining a first or second mode and a diagnostic value as a function of the first or second mode; and measuring the maximum combustion pressure value for fewer than all cylinders of the internal combustion engine.

49. The method of claim 48, further comprising determining a representative maximum combustion pressure and a representative injection start from the maximum combustion pressure values of the specified cylinders.

50. The method of claim 49, further comprising using the representative injection start for controlling all cylinders.

* * * * *